Jan. 27, 1959
O. R. FALCONI
2,870,671
AUTOCOLLIMATOR FOR MEASURING ANGLE OF INCIDENT LIGHT BEAM
Filed Aug. 30, 1955
2 Sheets-Sheet 1
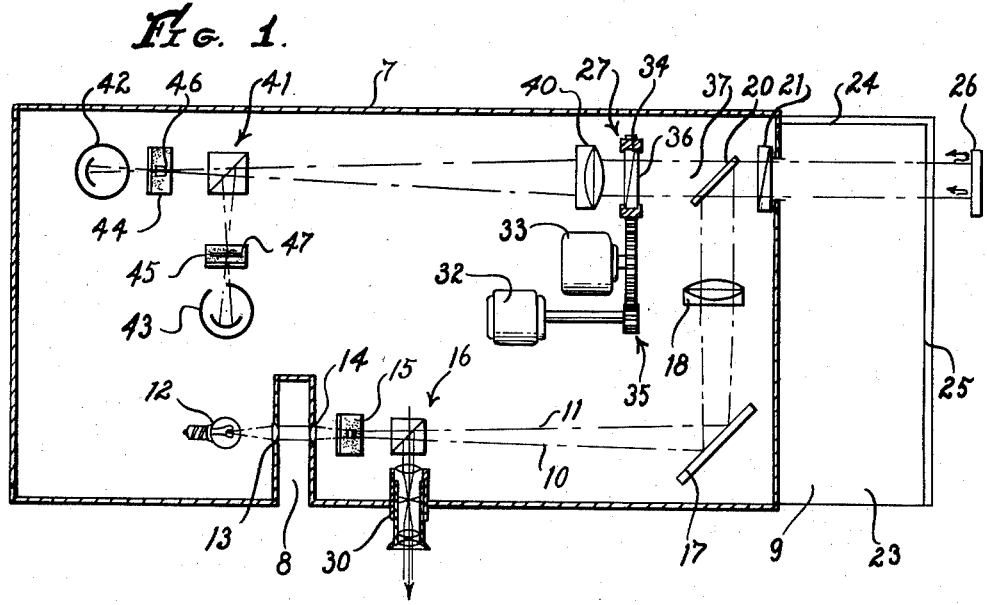
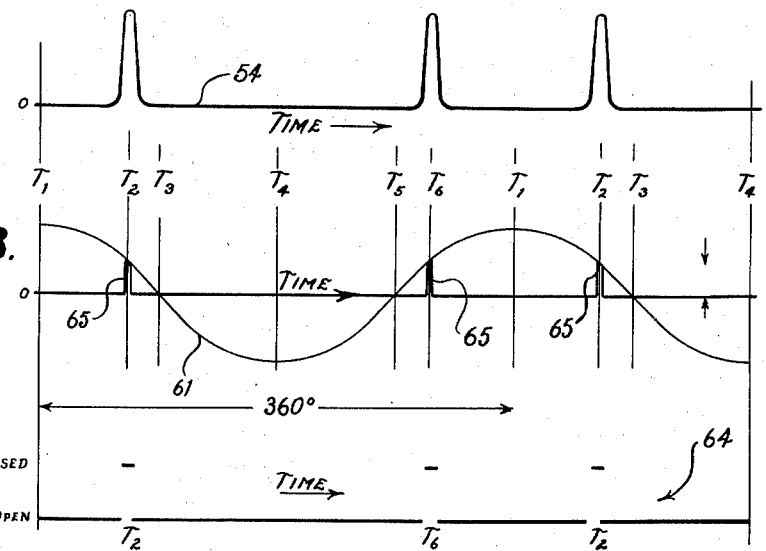
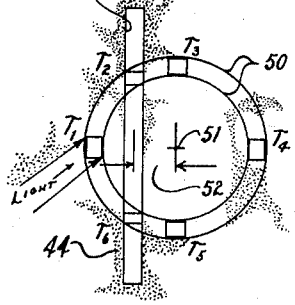
OSCAR R. FALCONI
INVENTOR.
BY HIS ATTORNEYS
HARRIS, KIECH, FOSTER & HARRIS Oscar R. Falconi,
INVENTOR.

BY HIS ATTORNEYS

Harris, Kiech, Foster & Harris

United States Patent Office 2,870,671
Patented Jan. 27, 1959

2,870,671

AUTOCOLLIMATOR FOR MEASURING ANGLE OF INCIDENT LIGHT BEAM

Oscar R. Falconi, Inglewood, Calif.

Application August 30, 1955, Serial No. 531,493

3 Claims. (Cl. 88—14)

The invention relates to an autocollimator for automatically, continuously and accurately measuring the angle of incidence of a beam of light entering it. Angle of incidence may be defined as the angle made by the intersection of a beam of light and a reference line.

It is an object of the invention to provide an autocollimator in which an entering beam of light is cyclically deflected in synchronism with a reference signal generator and in which the deflected beam is scanned over one or more light pickup units to produce signals indicative of the incidence angle of the beam. Another object of the invention is to provide such an autocollimator in which the entering beam may be projected from the autocollimator to an outside surface, and thence reflected back, or may originate from an external light source.

It is a further object of the invention to provide an autocollimator in which an entering beam is deflected in a cyclic pattern by an optical wedge so that the deflected beam traces a pattern on an apertured plate, permitting passage of light to a pickup system only at certain intervals. Another object of the invention is to provide such an autocollimator in which signals from the pickup system are combined with a reference signal to automatically indicate the angle of incidence of the beam.

It is another object of the invention to provide an autocollimator in which the light pickup output is not dependent upon the intensity of the beam nor upon the parameters of the pickup system but solely upon the relative timing of the energy pulses.

It is an object of the invention to provide an autocollimator in which the entering beam is deflected in more than one plane containing the reference line and in which the deflected beam is split to excite more than one pickup system, thereby giving an indication of changes in the angle of incidence with reference to each of the planes.

It is a further object of the invention to provide an autocollimator in which the angular information concerning the incident beam is provided in electrical form suitable for operation of servomechanisms and for automatic recording.

The invention also comprises novel details of construction and novel combinations and arrangements of parts, which will more fully appear in the course of the following description. The drawings merely show and the description merely describes a preferred embodiment of the present invention as applied to an autocollimator having a built-in light projection system, a rotating beam deflection mechanism, two mutually perpendicular deflected beam pickups and an electrical computing circuit for producing a pair of outputs proportional to the angle of incidence along two mutually perpendicular axes, which showing and description are presented by way of illustration or example.

In the drawings:

Fig. 1 is a diagrammatic plan view of a preferred embodiment of the invention;

Fig. 2 is a diagram showing the scanning pattern of the deflected beam of the embodiment of Fig. 1;

Fig. 3 is a chart showing the operation of various components of the embodiment of Fig. 1 as a function of time;

Figure 5:
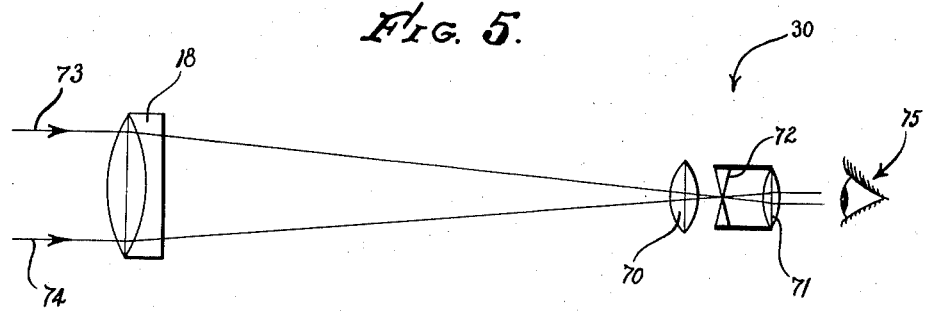
Fig. 5 is an optical diagram of the functioning of the eyepiece of Fig. 1 when the object being viewed is substantially at infinity.

The autocollimator of the invention includes a means for deflecting an incident beam of light in a cyclic pattern, a means for producing a reference signal which varies in synchronism with the cyclically deflecting means, means for producing another signal when the deflected beam traverses predetermined areas, and means for combining the reference signal and the other signal to produce a third signal which is a function of the angle of incidence.

In Fig. 1, a suitable housing 7 provides an outwardly-opening filter-receiving space 8 and an external shelf 9 at one end. A beam of light bounded by the lines 10, 11 is produced by a suitable source such as an incandescent lamp 12 and projected through a pair of lenses 13, 14 and an apertured plate 15 perpendicular to the base of the housing 7 but shown out of its plane for clarity. A parallel light beam is produced between the lenses 13, 14, and traverses the filter-receiving space 8, this space being suitable for the insertion of various filters of light of particular wavelengths as desired. The apertured plate 15 controls the size and shape of the effective source of the beam of light projected from the autocollimator and it is preferred in the practice of the invention to keep the aperture small and square in shape for reasons that will become apparent subsequently. The beam emerging from the apertured plate 15 passes through a beam-splitter prism 16, is reflected from a mirror 17, passes through an objective lens 18, is reflected from a semisilvered or semitransparent second mirror 20 and passes outward from the housing 7 after traversing an optical wedge 21 suitably mounted for manual rotary adjustment about the beam axis by means not shown.

The projection system just described is positioned so that the direction of the beam passing outward from the housing is parallel to the plane of a flat working surface 23 of the shelf 9, parallel to a reference edge 24 thereof, and perpendicular to a second reference edge 25 thereof. These surfaces and edges provide precisely known references from which collimation measurements may be made.

In the embodiment of Fig. 1, the angle that a reflecting surface of a mirror 26 makes with respect to the axis of the projected beam is being measured. Such a mirror may be mounted on the shelf 9 or to some external object the position or angular motion of which is to be determined with accuracy. The beam from the projection system is reflected by the mirror 26, passes again into the autocollimator through the optical wedge 21, through the mirror 20 and through a deflection system 27. The optical wedge 21 serves to deviate or displace the light beams passing therethrough. Since the deviation angle varies slightly with the color or wavelength of the light, the wedge may be color-corrected through the use of two or more wedges having suitable dispersion characteristics, cemented together. The wedge 21 is manually movable to provide for adjustment and calibration of the instrument, but serves no purpose in the incidence angle measurements after the instrument is in operation.

An eyepiece 30 is mounted perpendicular to the axis of the beam passing through the apertured plate 15 and in line with the beam-splitter prism 16 so that an operator of the instrument may visually inspect the placement of the object being tested, such as the mirror 26 or the position of the returning image. The eyepiece 30 is uniquely constructed to permit this visual inspection of the object being tested whether it is positioned directly in front of the instrument on the working surface 23 or positioned at such a distance from the instrument as to be considered at infinity for all practical purposes or to observe the returning image, which is at infinity. The novel construction of this eyepiece will be described in detail in conjunction with Fgs. 5 and 6 hereafter.

A preferred form of construction for the deflection system 27 includes a motor 32 which drives a reference signal potentiometer 33 and an optical wedge mount 34 through a gear train 35. An optical wedge 36 similar to the wedge 21 is positioned in the mount 34, the wedge 36 being rotated about an axis 37 by the motor 32 and gear train 35. The potentiometer 33 produces a signal which is a function of the angular position of the wedge 36 to provide a reference signal for interpreting the output of the instrument. In the embodiment disclosed in Fig. 1, the potentiometer 33 is a conventional sine-cosine potentiometer producing sinusoidal and cosinusoidal electrical voltages. The rotating wedge construction is preferred for this embodiment because the information obtained from the rotating deflected beam may be conveniently provided in terms of the angular position and motion of the entering beam in two mutually perpendicular planes, corresponding to motion in azimuth and elevation. It will be clear from the description of the operation of the instrument that other forms of motion of the wedge 36 may be utilized. For example, two wedges having means for adjusting the angle between them in the plane in which they are rotated may be used. When the two wedges are rotated in synchronism in the same direction, changes in this angle between the wedges will produce corresponding changes in the diameter of the circular pattern of the deflected beam. When the two wedges are rotated in opposite directions, elliptical and straight line patterns can be achieved.

Another advantage of the novel rotating wedge deflection system lies in the fact that the magnitude and direction of deflection of the beam is not noticeably affected by small movements of the wedge other than in rotation. Thus lateral or sidewise motion and pivotal or rocking motion due to loose or worn bearings and gears does not detract from the accuracy of the measurements.

The deflected beam from the deflection system 27 passes through an objective lens 40 to a beam splitter prism 41, which is similar to the prism 16. The two beams emerging from the beam splitter 41 are directed toward phototubes 42, 43, respectively, each of the phototubes being associated with a corresponding opaque plate 44, 45 positioned between it and the beam splitter. The opaque plates 44, 45 are perpendicular to the base of the housing, but are shown out of their planes for clarity. Each of the plates 44, 45 is provided with a transparent slit 46, 47 which permits the deflected beam or a part thereof to pass to the phototube when the beam is in a particular position. In the embodiment of Fig. 1, the slits 46, 47 are disposed perpendicular to each other in order to provide the desired azimuth and elevation information.

The operation of the autocollimator with respect to each of the phototubes 42, 43 is the same, and hence in the remainder of the specification reference will be made primarily to the phototube 42 and its associated components. The beam which is deflected by the rotating wedge 36 traces a circular pattern on the plate 44. This pattern is shown in Fig. 2, wherein the small squares show the position of the image produced by the deflected beam at various instants of time, denoted by the letter $t$ with sequential subscripts, and wherein the circular pattern is indicated by the lines 50. The center 51 of the circular pattern corresponds to the point upon which the center of the image of the entering beam would fall if the deflection system were not interposed between the beam and the plate 44. The position of the slit 46 is such that the image of an entering beam which is rotating in a circular pattern on the opaque plate 44 will pass through the slit and excite the phototube positioned behind the plate. Thus, it is seen that the distance 52 between the center 51 of the circle 50 and the center of the slit 46 is a measure of the angle of incidence of the beam in a plane parallel to the surface 23. It is understood that the slit 46 need not correspond to an entering beam parallel to reference edge 24, but may be positioned to correspond to any desired angle of incidence, the embodiment disclosed being preferable for a general purpose autocollimator.

As the deflected beam moves in its circular pattern, the phototube 42 will receive a light pulse at the time $t_2$ and again at the time $t_6$, and an electrical current will be produced in the phototube circuit during these times. The current output of the phototube 42 is shown in the diagram of Fig. 3 where the abscissa scale corresponds to time and the ordinate scale corresponds to the current in the phototube. The shape of the current pulses produced at the times $t_2$ and $t_6$, shown by the curve 54, will depend upon the size and shape of the slit 46 and of the image produced by the deflected beam, the preferred square shaped image and narrow slit co-acting to produce a sharp pulse of the nature shown in Fig. 3. The magnitude of the pulses shown in the curve 54 will depend upon the parameters of the phototube system and upon the intensity of the beam; however, as will be seen, this magnitude is not important since the operation of the system is dependent upon the time of occurrence of each pulse rather than the magnitude thereof. It should be observed that as the angle of incidence of the beam increases, the distance 52 increases, thus changing the relative timing or positions of the light pulses by decreasing the spacing of $t_6$, $t_2$ and increasing the spacing of $t_2$, $t_6$.

Similarly, the beam reaching the plate 45 will be transmitted by its slit 47 to the phototube 43. This will create a second set of spaced electric pulses which change in timing and spacing, relative to each other, in response to the angular changes of the entering beam in a plane perpendicular to the surface 23 and parallel to the edge 24. The outputs of the phototubes 42 and 43 may be electrically combined or related in various ways to deliver a composite signal responsive both to azimuth and elevation, for example, or these outputs may deliver separate signals indicating such components of the angle of incidence. In either instance, the reference signal or signals from the potentiometer 33 may be employed to give a desired orientation or reference.

Figure 4:
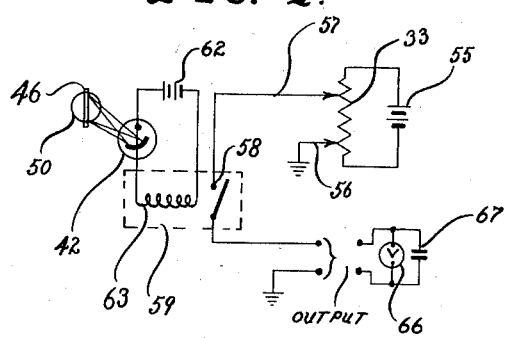
Fig. 4 is a schematic diagram of a simplified circuit for use with the embodiment of Fig. 1.

A simplified schematic of a preferred circuit for combining the output of the phototube 42 with the reference signal from the reference potentiometer 33 is shown in Fig. 4. Therein, a battery 55 is connected across a winding of the sine-cosine potentiometer 33, an arm 56 of the potentiometer being connected to circuit ground and a second arm 57 being connected to one contact 58 of a relay 59. As the deflection system 27 of Fig. 1 is rotated, there is a corresponding relative movement between the potentiometer winding and the constantly spaced arms 56, 57 whereby a sinusoidal voltage is produced across these arms, this voltage being shown by the curve 61 of Fig. 3. A battery 62 is connected in series with the phototube 42 and a coil 63 of the relay 59.

When a beam of light passes through the slit 46 and falls on the phototube 42, a current pulse is produced in the coil 63, thereby closing the relay contacts and coupling the sinusoidal voltage 61 to the output of the circuit of Fig. 4. The position of the contacts of the relay 59 corresponding to the current pulses of the curve 54 are shown by the graph or zone 64 of Fig. 3. Since the relay contacts are closed for only very short periods of time, the output of the instrument consists of short-duration samples of the sinusoidal voltage 61 as indicated by the voltage pulses 65 of Fig. 3. The magnitude of these voltage pulses 65 will be equal but will vary as a function of the position of the circular pattern 50 relative to the slit 46, and hence as a function of the angle of incidence which is to be measured. The magnitude of the voltage pulses may be measured by suitable means such as a D. C. voltmeter 66 having a capacitor 67 shunted across it, for the purpose of storing the sampled voltage.

When the center 51 of the circular pattern 50 is aligned with the center of the slit 46, the current pulses in the phototube will occur at the times $t_3$ and $t_5$. From the curve 61 of Fig. 3, it will be seen that there will be no output at this time, thereby indicating that the angle of incidence is zero or that the entering beam is parallel to reference edge 24. When the circular pattern moves to the right of the slit as viewed in Fig. 2, a positive voltage output will be produced, and when the circle moves to the left, a negative voltage output will be produced. Thus, it is seen that the phototube 42 and its circuit will give information as to the magnitude and direction of the azimuth deviation of an entering beam. The phototube 43 and a similar circuit will give information as to changes in elevation of the beam, both in magnitude and direction. The invention will work equally well with beams that are projected from the instrument and reflected back to it, and with beams that are produced by a source exterior to the instruument and directed toward it.

Figure 6:
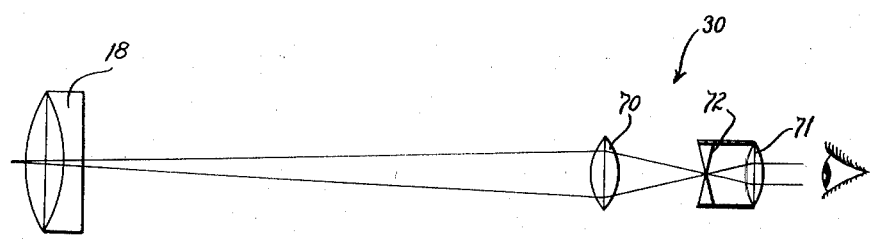
Fig. 6 is an optical diagram of the eyepiece of Fig. 1 when the object being viewed is directly in front of the objective lens.

In Figs. 5 and 6, the novel eyepiece 30 is shown in greater detail. The eyepiece consists of a field lens 70 and an eye lens 71, with crosshairs 72 positioned in front of the eye lens 71. While each of these lenses has been shown as a single element, it is to be understood that either or both may include a plurality of elements which are conventionally used to provide various types of correction. In Fig. 5, the incoming rays 73, 74 are substantially parallel, indicating that the object being viewed is positioned substantially at infinity. The field lens 70 and the eye lens 71 are positioned as shown in Fig. 5 so that the object being viewed is in focus to an observer shown diagrammatically at 75.

In Fig. 6, the object being viewed has been moved from infinity to a position directly in front of the objective lens 18. This object could not be brought into focus for a viewer using a conventional eyepiece, therefore, a single instrument having a field of view ranging from substantially zero distance to substantially infinite distance has not been possible. In the eyepiece 30 of the invention, the field lens 70 is maintained fixed relative to the objective lens 18, and the eye lens 71 and crosshairs 72 are moved relative to the field lens 70 to provide proper focusing for the viewer. With an eyepiece having the eye lens movable relative to the field lens, a range of focus from substantially zero distance to substantially infinite distance can be covered by moving the eye lens over a distance approximately equal to the focal length of the field lens.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for measuring the angle of incidence of an entering beam of light, the combination of: deflection means for cyclically deflecting an entering beam; reference signal means coupled to said deflection means, said reference signal means producing a reference signal that is a function of the status of said deflection means; a first opaque plate having a first transparent slit therein; a second opaque plate having a second transparent slit therein; beam-splitting means positioned between said deflection means and said plates, said beam-splitting means directing the deflected beam onto each of said plates, whereby the cyclically deflected beam traverses both of said slits, said first slit being disposed at an angle relative to said second slit; first pickup means located in optical line with said deflection means and said first plate to receive that portion of the deflected beam which traverses said first transparent slit; second pickup means located in optical line with said deflection means and said second plate to receive that portion of the deflected beam which traverses said second transparent slit, each of said pickup means producing an output that is a function of its received beam; and means for combining each of said outputs and said reference signal, said means producing an indication of the angle of incidence of the entering beam.

2. In an apparatus for measuring the angle of incidence of an entering beam of light, the combination of: an optical wedge for deflecting an entering beam; drive means coupled to said wedge to rotate same, reference signal means driven by said drive means in synchronism with said wedge, said reference signal means producing a reference signal that is a function of the angular position of said wedge; an opaque plate having a transparent portion therein, said plate being so positioned that rotation of said wedge causes the deflected beam to impinge on said plate and traverse said transparent portion; photosensitive means positioned adjacent said transparent portion whereby the deflected beam excites said photosensitive means when traversing said transparent portion, said photosensitive means producing a pulse output each time said beam traverses said portion; switch means having an input and an output; first circuit means connecting said pulse output to said switch means in actuating relationship; and second circuit means connecting said reference signal to said switch means input, said switch means output being a function of the angle of incidence of the entering beam.

3. In an apparatus of the character described, the combination of: means for producing a beam of light; projection means for directing said beam toward a reflecting surface, said projection means including beam-splitting means and an eyepiece, said beam-splitting means passing rays from said means for producing a beam of light toward the reflecting surface and permitting an operator to view images returning from the reflecting surface through said eyepiece, said eyepiece consisting of a field lens system fixed relative to the remainder of said projection means and an eye lens system movable relative to the remainder of said projection means; deflection means disposed to receive said beam after reflection from the reflecting surface, said deflection means cyclically deflecting the reflected beam; reference signal means coupled to said deflection means, said reference signal means producing a reference signal that is a function of the status of said deflection means; means for intercepting the cyclically deflected beam during part of the cycle and for transmitting it during the rest of the cycle; pickup means for receiving the beam when it is transmitted by the intercepting means, said pickup means producing an output that is a function of the transmitted beam; and means for combining said output and said reference signal, said means producing an indication of the angle of incidence of the beam.

References Cited in the file of this patent

UNITED STATES PATENTS

| | | |
|---|---|---|
| 853,812 | Lomb | May 14, 1907 |
| 967,143 | Arriaga | Aug. 9, 1910 |
| 1,553,211 | Barr et al. | Sept. 8, 1925 |
| 2,232,177 | Ide | Feb. 18, 1941 |
| 2,356,567 | Cockrell | Aug. 22, 1944 |
| 2,431,510 | Salinger | Nov. 25, 1947 |
| 2,451,409 | Petry et al. | Oct. 12, 1948 |
| 2,513,367 | Scott | July 4, 1950 |
| 2,651,771 | Palmer | Sept. 8, 1953 |
| 2,701,501 | Cuny | Feb. 8, 1955 |
| 2,713,134 | Eckweiler | July 12, 1955 |